US010602756B2

United States Patent
Wnukowski et al.

(10) Patent No.: US 10,602,756 B2
(45) Date of Patent: Mar. 31, 2020

(54) MILD FRACTIONATION OF FUNCTIONAL ISOLATES DERIVED FROM GRAINS AND OILSEEDS

(71) Applicant: NapiFeryn BioTech sp. z o.o, Lodz (PL)

(72) Inventors: Piotr Wnukowski, Delft (NL); Magdalena Kozlowska, Lodz (PL)

(73) Assignee: NapiFeryn Bio Tech sp. z o.o, Lodz (PL)

( * ) Notice: Subject to any disclaimer, the term of this patent is extended or adjusted under 35 U.S.C. 154(b) by 283 days.

(21) Appl. No.: 15/534,558

(22) PCT Filed: Dec. 11, 2015

(86) PCT No.: PCT/NL2015/050856
§ 371 (c)(1),
(2) Date: Jun. 9, 2017

(87) PCT Pub. No.: WO2016/093698
PCT Pub. Date: Jun. 16, 2016

(65) Prior Publication Data
US 2017/0318834 A1   Nov. 9, 2017

(30) Foreign Application Priority Data
Dec. 11, 2014   (NL) .................................... 2013960

(51) Int. Cl.
*A23J 1/14*   (2006.01)
*A23J 3/14*   (2006.01)
*A23J 3/16*   (2006.01)

(52) U.S. Cl.
CPC . *A23J 1/14* (2013.01); *A23J 3/14* (2013.01); *A23J 3/16* (2013.01)

(58) Field of Classification Search
CPC ........ A23J 1/14; A23J 3/14; A23J 3/16; A23J 1/142; A23J 3/346; A23J 1/006;
(Continued)

(56) References Cited

U.S. PATENT DOCUMENTS 3,018,280 A * 1/1962 Salzberg ................... A23J 1/12
530/360
5,844,086 A   12/1998 Murray
(Continued)

FOREIGN PATENT DOCUMENTS

EP   2 736 351 A1   6/2014
GB   1 570 746 A    7/1980
(Continued)

OTHER PUBLICATIONS

Campesi et al., "Determination of the average shear rate in a stirred and aerated tank bioreactor", Bioprocess Biosyst Eng, 2009, vol. 32, pp. 241-248.
(Continued)

*Primary Examiner* — Hong T Yoo
(74) *Attorney, Agent, or Firm* — Gilberto M. Villacorta; Sunit Talapatra; Foley & Lardner LLP

(57) ABSTRACT

The present invention relates to a process of extracting native proteins from vegetable source materials such as oilseeds, legumes and grains. Native proteins mentioned in this invention are present in the source material in their non-denatured state, i.e. with their functional properties relevant to application in food industry like solubility preserved and not compromised by processing conditions. Source materials mentioned in the present invention are of vegetable origin and typically contain significant (>5% by weight) amounts of native oils and lipids. The invention further relates to a device for carrying out this process and to the native protein obtainable by the process of the invention.

27 Claims, 6 Drawing Sheets

(58) Field of Classification Search
CPC ........ A23L 33/185; A23L 11/05; A23L 11/32; A23L 2/66; A23L 5/23; A23L 1/3055; A23V 2250/5488; A23V 2200/3324; A23V 2200/254; A23V 2250/548; A23V 2250/54; C08L 89/00
See application file for complete search history.

(56) References Cited

U.S. PATENT DOCUMENTS

| | | | |
|---|---|---|---|
| 2003/0091717 A1* | 5/2003 | Porter | A23C 9/1234 426/590 |
| 2007/0004908 A1 | 1/2007 | Gosnell et al. | |
| 2007/0207254 A1* | 9/2007 | Crank | A23C 11/103 426/634 |

FOREIGN PATENT DOCUMENTS

| | | |
|---|---|---|
| WO | WO-2013/013949 A1 | 1/2013 |
| WO | WO-2014/147068 A1 | 9/2014 |

OTHER PUBLICATIONS

Carta et al., "Downstream processing of biotechnology products", Protein Chromatography: process Development and Scale-Up, 2010, pp. 1-56.
International Search Report issued in International Patent Application No. PCT/NL2015/050856, dated Jun. 8, 2016.

* cited by examiner

A.

B.

C.

D.

E.

F.

G.

A.

B.

MILD FRACTIONATION OF FUNCTIONAL ISOLATES DERIVED FROM GRAINS AND OILSEEDS

CROSS-REFERENCE TO RELATED APPLICATIONS

This application is the National Phase of International Patent Application No. PCT/NL2015/050856, filed Dec. 11, 2015, published on Jun. 16, 2016 as WO 2016/093698 A2, which claims priority to Netherlands Patent Application No. 2013960, filed Dec. 11, 2014. The contents of these applications are herein incorporated by reference in their entirety.

FIELD OF THE INVENTION

The present invention relates to a process of extracting native proteins from vegetable source materials such as oilseeds, legumes and grains. Native proteins mentioned in this invention are present in the source material in their non-denatured state, i.e. with their functional properties relevant to application in food industry like solubility preserved and not compromised by processing conditions. Source materials mentioned in the present invention are of vegetable origin and typically contain significant (>5% by weight) amounts of native oils and lipids. The invention further relates to a device for carrying out this process and to the native protein obtainable by the process of the invention.

BACKGROUND THE INVENTION

The global demand for edible proteins is increasing steadily, propelled by the growing world population. This trend is further reinforced by the increasing income per capita in developing countries. Multiple studies indicate the advantage of using plant proteins, i.e. proteins derived from source materials of vegetable origin, as vital component in the human diet. The production of plant protein is typically more sustainable than that of animal protein in terms of greenhouse gas emissions and the use of scarce resources like land, water and energy. An increase in the use of plant proteins would therefore significantly contribute to more sustainable protein supply in the future.

Main sources of plant proteins are legumes such as soy beans, peas, faba beans, oil seeds such as rape seed, sunflower and cereals such as wheat and maize. To increase the use of plant proteins in human diet, methods of isolation of the proteins from plants need to be developed and deployed on industrial scale. The challenge is to obtain (edible) protein isolates with high purity (i.e. low in fat content and free from anti-nutritional factors) and with preserved desirable functional properties of the protein such as solubility, ability to form stable foams, ability to form gels, and water-absorbing and fat-absorbing ability and capacity.

Prior art technology for removal of endogenous oils and lipids from crude vegetable protein sources such as oilseeds usually implies use of low boiling organic solvents such as butane or hexane. Residuals of such solvents in the remaining protein-rich fraction of the crude vegetable protein source after oil/lipid extraction, have to be removed subsequently by use of heat in a purposely devised step, sometimes called desolventization—toasting, where high temperatures and steam are used to remove the solvent. Unfortunately, such harsh conditions may significantly limit the subsequent extractability and resulting functionality of the proteins. That is to say, the lipid/oil extraction methods commonly applied result in non-native proteins with low value to the food industry.

Subjecting vegetable protein source material, such as oilseed meal to hexane and desolventization-toasting results in irreversible interactions of proteins present in the source material with the anti-nutritional factors such as phenolic compounds and phytates. These interactions provide difficulties regarding removal of these anti-nutritional factors in the subsequent process of isolation of proteins.

Presence of fat in the vegetable protein source material poses a tremendous challenge to the processor, since the conventional technologies described in the prior art do not provide for an effective method of separating fat from proteinaceous components of the source material without compromising functional properties of the proteins.

If conventional techniques for extraction of proteins are applied, such as extensive mixing and agitating of source material with extraction solvent in a stirred vessel, oils and lipids typically co-extract with the proteins. Oils and lipids, when released from the source material during the extraction process, form emulsions that are stabilized by the proteins present in the source material. Applying technologies described in prior art for isolation of proteins such as those technologies used for processing of soy meals, results in concentration of fat together with the protein.

The fat present in the final isolate severely impairs the functionality of the protein as it can also lead to rancidity and other fat related problems, including poor solubility, caking as well as discoloration.

Patent application US 005844086A suggested a process concept to isolate proteins from oil cakes of canola having a fat content up to 10%, which process comprises steps such as: extraction proteins from canola cake in saline solution, pressing, centrifugation, fine filtration, ultrafiltration, combined with dilution and chilling of the intermediate process liquids to remove fatty layer by decantation. While such a process could potentially be applied to oilcakes that have not been treated with hexane, it does not provide the solution that could be readily implemented on industrial scale, due to the multi-step process. Also noteworthy is that the Murray process implies usage of traditional extraction techniques, thus including an extraction step using organic solvent and including a desolventization-toasting step.

In WO 2013/013949 a protein isolation process is provided for isolation of protein from oil cake comprising the steps of: extraction of proteins with aqueous solution, concentration and adding water-soluble organic solvent to obtain a protein precipitate. Extraction of the proteins is carried out by providing a suspension of a crude vegetable protein source in water and stirring the suspension The shear stress applied to a protein source by the stirring induces release of lipids from the source material and formation of stable emulsion of fats and proteins that is difficult to separate from the extract in the subsequent process steps. This phenomenon will be particularly severe when the conventional technique of extraction in the stirred vessel is applied on industrial scale, as it is known in the prior art that shear rates in the large scale stirred vessel reach levels of 100-1000 per second [Camperi A., et al., 2008; Carta G, Jungbauer, 2010].

In WO 2014/147068 a protein isolation process is provided for isolation of protein from oil cake comprising the steps of subjection oil seed meal to gravity induced solid-liquid extraction and optionally collecting the resulting intermediate aqueous protein solution. The multi-component system for isolation a protein fraction according to the process of WO 2014/147068 comprises 4 pump units and two containers. Relatively large volumes of aqueous solution are applied during the protein isolation process.

Current methods and devices all bear one or more of the drawbacks as exemplified above. Protein native conformation is not conserved when vegetable source material is subjected to a protein extraction process, in several conventional methods. Devices for a process of retrieving a protein extract from a vegetable sources are hard to scale up, or it has to be used in a laborious manner, requiring numerous components and a large volume of solvent, in several occasions. The field is thus demanding a scalable process and a suitable device for such scalable process, for preparing a protein extract comprising protein in its native conformation from vegetable sources such as oilseeds. The process should have gentle mild conditions leaving the native conformation of protein in the e.g. oilseed starting material intact. Ideally, the process consumes less solvent and ideally, the device comprises a limited number of components, i.e. tanks, pumps, etc.

SUMMARY OF THE INVENTION

A first aspect of the invention relates to a process for the preparation of a protein extract from the meal or oil cake of oil seeds, wherein the process comprises:
  a) preparing in a container a mixture of aqueous solution and comminuted meal or oil cake from oil seeds, wherein the comminuted particles have an average particle size (d32) smaller than 1000 μm, preferably between 50 μm and 500 μm;
  b) creating a fluidized bed of the comminuted meal or oil cake particles in the container by means of flow generating means provided in the container and letting at least a part of the proteins present in the comminuted meal or oil cake dissolve into the aqueous solution;
  c) separating under fluidized bed conditions at least a part of the dissolved protein from the mixture by means of filtration means provided in the container, such that a protein extract is obtained.

The present invention provides an improved process for the mild non-denaturing extraction and isolation of protein from vegetable sources such as oilseeds whereby source material from which proteins are extracted may contain significant amounts of endogenous oils and lipids. The aim of the process is to extract native proteins aimed for human consumption, i.e. native and edible proteins. Therefore, the process of the invention conserves functional properties of the native protein, and the process of the invention avoids process steps that impair the native conformation of the protein in the protein extract, such as high temperature above 50° C., extreme pH below 4 or higher than 10, and use of protein-denaturing compounds or solutions. One object of the invention is to obtain an aqueous extract of proteins with low content of fat and lipids, with the proteins in the extract having their native conformation. A second aspect of the invention relates to a protein extract obtainable by the process according to the invention.

A third aspect of the invention relates to a device 1 for preparing a protein extract 29 from meal or oil cake of oil seeds, which device comprises a closed container 20, 20a having a lower part 20' and an upper part 20'', and wherein in the lower part of the container a distributer 32 for aqueous solution 31 is positioned, which distributer is arranged for generating a stream of aqueous solution from the lower part of the container to the upper part of the container in a first direction, and wherein the container further comprises at least one filtering unit 21 positioned above the distributer for aqueous solution, which filtering unit comprises a substantially flat filter element, the surface of which is parallel to the first direction and is provided with a filter having an opening size in the range of 4 μm to 200 μm, preferably 4 to 100 μm and a free area between 20% to 50% and wherein the filtering unit is provided with at least one outlet 22 for the permeate of the filtering unit.

DETAILED DESCRIPTION OF THE INVENTION

The present invention relates to a process of preparing an extract from source materials of vegetable origin such as meals or oil cakes of oil seeds, legumes or cereals comprising of:
  a) preparing in a container a mixture of comminuted source material and water;
  b) supplying water at the base of the container by means of purposely designed flow distributor system and by doing so creating a fluidized (expanded) bed of the source material suspended in the upward flowing stream of water;
  c) letting the flow of water continue until the material in the container distributes itself into distinct fractions due to their size and density, with stratification of material reflecting the balance of forces prevailing in the system with most coarse and dense fraction residing at the bottom of the bed and the light fraction enriched with oils and lipids residing at the upper part of the bed;
  d) withdrawing the extract containing dissolved proteins from the container by means of filtering device submerged in the bed formed by source material.

The filtering device separates (insoluble) residues of the source material such as fat (oil), lipids, hulls, from the extract containing dissolved proteins. The lipid phase associated with the residual solids generally substantially remains in the container (retentate) and the extract collected on the filtrate side of the filtering device (permeate) has reduced content of oil and lipids as compared to the ratio of lipids to protein in the source material. That is to say, the protein extract, i.e. the filtrate, is enriched in protein compared to the starting material in the container. Typically, the lipid content of the protein extract obtained with the process of the invention is less than 10 wt % based on dry weight, preferably between 0.5 wt % and 4 wt %, or lower, whereas the protein content of the protein extract obtained with the process of the invention is at least 35 wt % based on dry weight, preferably at least 45 wt %, or higher.

Protein extract collected on the filtrate (permeate) side is then preferably subjected to a concentration step and a washing step to remove soluble compounds such as non-protein nitrogen compounds, phenolics, phytates, carbohydrates, glucosinolates and salts. This operation can be accomplished by employing a suitable ultrafiltration (UF) technique known in the art, with the UF membrane used in the process being 'tight' enough, i.e. having pores large enough to retain proteins on the retentate side while molecules smaller than the cut-off size of the membrane are permitted to pass the membrane and are collected on the permeate side of the UF unit.

Protein concentrate obtained after UF step with the protein extract is preferably advantageously processed in a further step including separation into protein fractions by application of any of the techniques suitable to fractionate proteins according to the Osborne scheme, known in the art and as described for example in [Owusu-apenten R., 2004].

For rapeseed proteins, two dominant protein fractions are albumin napins which are water soluble, and globulin cruciferins, which are soluble in saline solutions. Both napins and cruciferins are insoluble in 70 vol % ethanol.

A person skilled in art knows that reducing the ionic strength of the protein concentrate obtained after UF containing native napins and cruciferins induces precipitation of the globulin fraction while leaving the albumin fraction mainly in solution. A person skilled in the art knows that addition of a water-soluble solvent such as for example ethanol up to a concentration of about 70 vol %, as envisaged by the Osborne scheme, will precipitate albumins and globulins while leaving prolamines (i.e. proteins soluble in 70 vol % ethanol) in solution. As napins and cruciferins are not belonging to the class of prolamines, they will be precipitated upon addition of ethanol to aqueous solution containing these protein fractions.

Proteins are isolated from solutions by suitable techniques known in the art to remove water or solvents used in the process. Protein precipitates and aqueous protein concentrates are dried by spray drying, vacuum drying, lyophilization, known in the art.

Thus a first aspect of the invention relates to a process for the preparation of a protein extract from the meal or oil cake of oil seeds, wherein the process comprises:
a) preparing in a container a mixture of aqueous solution and comminuted meal or oil cake from oil seeds, wherein the comminuted particles have an average particle size (d32) smaller than 1000 μm, preferably between 50 μm and 500 μm;
b) creating a fluidized bed of the comminuted meal or oil cake particles in the container by means of flow generating means provided in the container and letting at least a part of the proteins present in the comminuted meal or oil cake dissolve into the aqueous solution;
c) separating under fluidized bed conditions at least a part of the dissolved protein from the mixture by means of filtration means provided in the container, such that a protein extract is obtained.

Optionally, in the process according to the invention, the comminuted particles have an average particle size (d32) between 800 μm and 1000 μm.

Equally preferred in the process according to the invention are comminuted particles having an average particle size (d32) smaller than 200 μm.

A person skilled in art will understand that comminuting starting material to smaller size may be beneficiary for the mass transfer and extraction of proteins from the source material. The same reasoning applies for release of the lipids like tri-glycerides and phospholipids present in the source material. It is therefore part of the invention to optimize the grinding (comminution) conditions in such a way as to achieve acceptable extraction yield regarding proteins while preventing excessive disruption of the oil bodies containing lipids, which oil bodies are a natural part of the source material (like in rapeseed). Inventors have found that conducting the process of extraction according to the invention with material comminuted to the size range 0-200 μm results in improved extraction of proteins but at the expense of relatively increased release of lipids to the crude extract. Processing the same vegetable source material (rapeseed cake) comminuted to a different size range (800-1000 μm) under the same process conditions still resulted in efficient extraction of proteins but at the same time with much improved retention of the lipids on the side of retentate.

It is part of the invention that any particle size of comminuted vegetable source material is convenient for application in the process of the invention, when the particular applied particle size (range) does not induce clogging of the filter of the filtering unit. Exemplifying experiments with comminuted oilseed meal having particle size distributions in the ranges as provided above, revealed protein extract according to the invention without inducing clogging of the filter. See the Examples as provided below, for preferred aspects of the invention regarding applicable particle sizes.

The inventors found that for most sources of oilseed meal water is applicable as the aqueous solution in the process of the invention. Also preferred is NaCl solution, for example at 0.1 M, or even as high as 2 wt %, as the aqueous solution in the process of the invention. Fluidized beds consisting of aqueous solution of water with organic solvent are also preferred for the process of the invention.

Preferably, in the process according to the invention, the aqueous solution is thus selected from water, or a mixture of water and less than 20% by volume of a water soluble organic solvent selected from alcohols and ketones, preferably ethanol or acetone, or mixtures thereof.

If needed, preservatives may be added to the aqueous solution in the process of the invention. The process of the invention is in fact equally applicable if the aqueous solution further comprises an inorganic salt and/or a preservative. Safety requirements regarding the edibility of the protein extract obtainable by the process of the invention limit the selection of suitable inorganic salt or preservative. Typically, NaCl is selected as inorganic salt in the aqueous solutions according to the invention.

In the process according to the invention, optionally the aqueous solution further comprises at least one additive selected from an inorganic salt, a preservative such as ascorbic acid, or mixtures thereof. A particularly preferred inorganic salt is NaCl, preferably the aqueous solution is an about 2 wt % NaCl solution.

Generally, proteins from vegetable origin, e.g. proteins in oilseeds, have a stable native conformation in a milieu with a pH within the range 4 to 10. Typically, proteins extracted from e.g. oilseeds preserve their native conformation in solution with a pH of about 6.5 to 7.5, preferably around 7.

Hence, the pH of the aqueous solution preferably ranges between 4 to 10, preferably between 6 to 8, more preferably between 6.5 to 7.5, most preferably about 7 in the process according to the invention.

In the examples section, results of protein extractions with the process of the invention are provided for rapeseed, sunflower and soy bean. The process of the invention is equally suitable for any vegetable materials comprising proteins, if provided in particulate form and if suitable for application in a fluidized bed. The process of the invention is particularly suitable for vegetable material originating from oilseed.

Preferably, in the process according to the invention, the comminuted meal or oil cake has been prepared from soy, rapeseed, sun flower, flax, linola, coconut, mustard seed meals, cottonseed, grain, wheat, rye, oat, rice, rice bran or legumes such as peas or faba beans. Of course, other sources of oil cake are equally applicable in the process of the invention.

The inventors found a method for providing a protein extract with the protein from vegetable origin and with the protein having its native conformation suitable for application in food processing technology. Since the skilled person is aware of the protein denaturing effects of common methods for extracting oil from oilseeds. i.e. methods in which oilseeds are subjected to e.g. hexane extraction and/or toasting, in the process of the invention, preferably comminuted oilseeds are applied that were not subjected to these harsh oil-extraction steps.

Highly preferably is thus a process according to the invention, wherein the comminuted meal or oil cake is cold-pressed.

A process according to the invention is thus also highly preferred, wherein the comminuted meal or oil cake is non-hexane treated.

Solubility of the native proteins in the protein extracts obtainable by the process of the invention is to some extent determined by the ionic strength of the aqueous solution applied during extraction. The inventors obtained highly stable protein extract with long-lasting preserved native conformation, when the aqueous solution during extraction has an ionic strength of 0.05 to 0.6. For example (see preferred embodiments in the examples below) good results were obtained with an NaCl solution of 0.1 M or 2 wt %.

Preferably, in the process according to the invention, the ionic strength of the aqueous solution is 0.05 to 0.6 expressed as molality units, i.e. total number of moles of solutes as per kg water, more preferably 0.3 to 0.4. Most preferably the ionic strength of the aqueous solution is about 0.34. A 2 wt % NaCl aqueous solution has an ionic strength of about 0.34.

Stability of natively folded proteins, such as proteins in the protein extract obtained with the process according to the invention, is in part determined by the temperature of the aqueous solution comprising the dissolved protein. In the process of the invention, protein extract with native conformation typically was retrieved when applying aqueous solution at ambient temperature or lower. Dependent on the source of vegetable material, higher temperature is equally suitable, as long as native conformation of the protein in the protein extract is preserved. Of course, native conformation of such protein retrieved with the process of the invention is easily accessed applying routine analytical methods known to the person skilled in the art of protein biochemistry. A suitable e.g. an optimal temperature for the process of the invention is thus readily determined, with regard to preserved native protein conformation.

The process according to the invention preferably has a temperature during step b) and c) of below 50° C., more preferably 5° C. to 30° C., even more preferably 10° C. to 25° C., most preferably 12° C. to 16° C.

Food industry is awaiting a fast and scalable process for the isolation of natively folded proteins from vegetable sources. The present invention does not only provide for such a fast and scalable protein extraction method, though moreover, the process of the invention also provides for a protein extract that is enriched in protein with regard to e.g. non-edible components present in the vegetable source material, and fat and oil. The process of the invention thus provides a protein extract that is enriched in protein.

Preferred is a process according to the invention, wherein in step c) protein is selectively separated under fluidized bed conditions by a selected shear rate and a selected superficial average velocity of the flow of aqueous solution from the flow generating means, such that an enriched protein extract is obtained.

An important aspect of the process of the invention is the low shear rates that are applied regarding tangentially flowing aqueous solution comprising the solubilized proteins from vegetable source material and the filter of the filtering unit in the process according to the invention. In the process of the invention, applying only low shear rates to the solution comprising protein to a large extent contributes to preserving the native conformation of the protein.

Also preferred is thus a process according to the invention, wherein in step c) the separation by means of filtration means is under low shear rate of below 20 per second, more preferably between 1 to 10 per second, most preferably about 10 per second.

Importantly, protein denaturing process steps implying e.g. agitation, shaking, etc., are completely absent for the process of the invention, further contributing to the preservation of the native conformation of protein in the protein extract according to the invention. Avoidance of agitation, shaking, etc., also contributes to a large extent to avoiding freeing of oil droplets (lipids, fat) from the solid particles into aqueous solution. This is particularly beneficial for consolidating free flow of solubilized protein through the filter (preventing clogging), and is particularly beneficial for obtaining further enrichment of the protein in the protein extract (by preventing oil droplets from entering the permeate).

As said, the process according to the invention is suitable for extracting proteins of virtually any vegetable sources, as long as specifications as provided above are met. The process is now particularly suitable for extracting proteins from vegetable material that is rich in lipids, such as oilseeds.

Thus, preferably, in the process according to the invention, the comminuted meal or oil cake particles comprise more than 5% by weight lipids.

As said, the process of the invention provides for a protein extract that is preferably enriched in protein content. Of course, the protein content of the crude starting vegetable material influences the yield and extent of enrichment of the retrievable protein extract.

Preferred is thus a process according to the invention, wherein the comminuted meal or oil cake particles comprise between 5 to 60% by weight protein, more preferably between 10 to 40% by weight protein.

It is a particular benefit of the process according to the invention that only low shear stress is applied to the proteins dissolving from the oil seed particles in the aqueous solution. Such low shear stress is applied to the aqueous solution for example by an upward flow generated by flow generating means positioned in a lower part of the container. A further benefit of such upward flow of aqueous solution is the provision of a gradient of comminuted meal or oil cake particles with regard to the mass and/or density of such particles. Typically, near the bottom side of the container particles with relatively higher weight or density will remain, whereas lighter particles will distribute along the longitudinal direction of the container, in the direction of the flowing aqueous solution.

Typically, by also adjusting the superficial average velocity of the aqueous solutions, it is now possible to have oil droplets ending up near the top end of the container, whereas heavier particles such as hull, will stay nearer to the bottom side of the container. Concomitantly, the flow is selected within a range that avoids clogging of the filters and blocking protein from entering the permeate side of the filtering unit. Of course, the flow rate is also fine-tuned with regard to the opening size of the filter in the filtering unit. It was now found that in the process of the invention, suitable superficial average velocity is in the range of 0.1 to 10 mm per second, and suitable opening size of the filter is in the range of 4 to 200 μm and between 20% to 50% free area, preferably the filter has an opening size in the range of 40 to 100 μm and between 30-40% free area.

In the process according to the invention, preferably the flow generating means for creating a fluidized bed of the comminuted meal or cake particles is positioned in a lower part of the container such that an upward stream of the aqueous solution is formed which creates the fluidized bed of particles.

Preferably, in the process according to the invention, the flow of aqueous solution from the flow generating means has a superficial average velocity of 0.1 to 10 mm per second, more preferably 0.5 to 5 mm per second.

Preferably, in the process according to the invention, the filtration means comprises a filter having an opening size in the range of 4 to 200 µm and between 20% to 50% free area, more preferably the filter has an opening size in the range of 10 to 100 µm and between 30-40% free area, most preferably the filter has an opening size in the range of 40 to 100 µm and between 30-40% free area.

Tendency of protein to lose its native conformation generally is larger when exposed to hydrophobic surface than when exposed to a hydrophilic surface. Therefore, in the process according to the invention, the filtration means preferably comprises a filter made of hydrophilic material.

Hydrophilic surfaces applicable in protein isolation and purification biology are known in the art. Typical surfaces compatible with maintaining native protein structure are for example stainless steel, Teflon and plastics as commonly applied in protein chromatography technologies.

Preferably, in the process according to the invention, the filter made of hydrophilic material is made of stainless steel.

In order to provide for optimal low shear rate conditions during extraction of protein from the comminuted vegetable particles, the inventors found that it is particularly suitable to provide for a filtration means positioned tangentially to the flow of aqueous solution. It was found that native fold is optimally conserved when applying the low shear rates achievable in such arrangement of filtration means and tangential flow, according to the invention.

The process according to the invention has a filtration means which is preferably positioned tangentially to the flow of aqueous solution created by the flow generating means.

The examples below show preferred embodiments of the invention, providing protein extract with 10% fat based on dry weight or lower. Oil droplets (comprising lipids, fat) on average have a diameter of about 10 µm. The inventors found that majority of the oil droplets in the protein extract are removed by subjecting the protein extract in the permeate to a centrifugation step and/or a second filtration step using filtration means comprising a filter having an opening size of smaller than 10 µm, more preferably about 4 µm, most preferably about 1 µm.

Preferably, in the process according to the invention, the process thus further comprises a step d) wherein the protein extract is subjected to a centrifugation step and/or a second filtration step using filtration means comprising a filter having an opening size of smaller than 10 µm, more preferably about 4 µm, most preferably about 1 µm, such that at least part of the lipid fraction in the protein extract is discarded from the protein extract.

The protein extract according to the invention is preferably either directly subjected to further purification steps, or after the oil-discarding step as outlined above. Preferably, the protein extract is subjected to a protein precipitation step comprising addition of a solvent such as a small molecule organic solvent, preferably compatible with the use of protein in food industry. Suitable solvents are for example methanol, ethanol and acetone, with ethanol particularly preferred. Solvent is typically added to the protein extract to a final vol % of 70 or higher, according to the invention, for example 70-95 vol %.

The process according to the invention preferably further comprises a step d) (when no centrifugation step and/or a second filtration step has been subjected to the protein extract), or further comprises a step e) (when a centrifugation step and/or a second filtration step has been subjected to the protein extract), wherein methanol, ethanol or acetone is added to the protein extract, such that a protein precipitate is formed; and a further step wherein the protein precipitate is separated from the liquid fraction.

Preferably, the organic solvent added to the protein extract, to precipitate the protein in the protein extract in the process according to the invention, is ethanol.

For application in food products, the precipitated protein obtained upon addition of solvent as described is preferably subsequently dried upon applying any suitable method for drying protein known in the art for preserving the native fold of the protein.

In the process according to the invention, in a further step the protein precipitate is thus dried after the protein precipitate is separated from the liquid fraction.

Protein precipitation upon addition of solvent, e.g. ethanol, is facilitated by a relatively high protein concentration. Therefore, it is part of the process of the invention to first subject the protein extract to a protein concentration step known in the art, before the protein is precipitated upon addition of solvent to the protein concentrate. Preferably, the protein extract is also further purified according to the invention, by discarding small molecule contaminants. A suitable and convenient way to concentrate and concomitantly purify the protein in the protein extract according to the invention is by applying diafiltration.

Thus, preferably, in the process according to the invention, prior to any subsequent step, the protein extract obtained in step c) is diafiltrated, preferably by using ultra filtration.

It is an important achievement of the process of the invention, that a protein extract is obtainable within a time span of 4 hours, preferably within 10 minutes to 200 minutes. The inventors found that for most applications, the protein extract with optimal protein recovery while at the same time keeping recovery of lipids as low as possible, is obtained by applying the process of the invention for about 20 minutes to about 120 minutes, most often in about 60 minutes. That is to say, in the protein extract protein recovery is over 30% based on dry weight whereas fat recovery is less than 6% based on dry weight, most often less than 3% based on dry weight. As said before, the fat content is conveniently further lowered upon application of a subsequent centrifugation step and/or further filtration step using a filter with pores of 10 µm or smaller.

In the process according to the invention, in step c) preferably at least part of the dissolved protein is separated in 10 minutes to 200 minutes, preferably in 20 minutes to 120 minutes, more preferably in about 60 minutes.

Thus, preferably, a process according to the invention provides a protein extract in step c) wherein the lipid content of the protein extract is less than 10 wt % based on dry weight, preferably less than 6 wt % based on dry weight, more preferably 0.5 wt % to 4 wt % based on dry weight, and wherein in step c) the protein content of the protein extract is at least 30 wt % based on dry weight, preferably at least 35 wt % based on dry weight, more preferably at least 40 wt % based on dry weight, most preferably at least 45 wt % based on dry weight.

The inventors not only found a convenient and scalable process for obtaining a protein extract from e.g. a source of oil seed cake or meal, with keeping protein conformation in the native state, but the inventors also found a protein concentrate applicable in food industry according to the invention.

Thus, a second aspect of the invention is a protein extract obtainable by the process according to the invention.

Preferably, the lipid content of the protein extract according to the invention is less than 10 wt % based on dry weight, preferably less than 6 wt % based on dry weight, more preferably 0.5 wt % to 4 wt % based on dry weight.

As said, the lipid content of the protein extract of the invention is readily further lowered upon applying further filtration or centrifugation.

A protein extract with low fat content is one of the several benefits of the process of the invention and the protein extract of the invention. Due to the low fat content, protein is enriched in the protein extract of the invention. Typically, the protein content of the protein extract is at least 35 wt % according to the invention. See for typical embodiments of the invention the examples provided below.

Preferably, the protein content of the protein extract of the invention is at least 30 wt % based on dry weight, preferably at least 35 wt % based on dry weight, more preferably at least 40 wt % based on dry weight, most preferably at least 45 wt % based on dry weight. Preferably, the protein content of the protein extract of the invention is at least 50 wt %.

Thus, preferably, a protein extract according to the invention is provided, wherein the lipid content of the protein extract is less than 10 wt % based on dry weight, more preferably less than 6 wt % based on dry weight, most preferably 0.5 wt % to 4 wt % based on dry weight, and wherein the protein content of the protein extract is at least 30 wt % based on dry weight, preferably at least 35 wt % based on dry weight, more preferably at least 40 wt % based on dry weight, most preferably at least 45 wt % based on dry weight.

The process of the invention is particularly suitable for providing protein extracts comprising protein that is valuable to the food industry. When the vegetable source material is for example an oil seed material such as a cake or meal that was not subjected to protein denaturing conditions, the protein obtainable by the process of the invention typically and preferably is an edible protein.

Thus, the protein extract according to the invention preferably contains edible protein.

The inventors also provide for a device suitable for applying the process of the invention, to obtain protein extract according to the invention.

A third aspect of the invention relates to a device for preparing a protein extract from meal or oil cake of oil seeds, which device comprises a closed container having a lower part and an upper part, and wherein in the lower part of the container a distributer for aqueous solution is positioned, which distributer is arranged for generating a stream of aqueous solution from the lower part of the container to the upper part of the container in a first direction, and wherein the container further comprises at least one filtering unit positioned above the distributer for aqueous solution, which filtering unit comprises a substantially flat filter element, the surface of which is parallel to the first direction and is provided with a filter having an opening size in the range of 4 µm to 200 µm, preferably 4 µm to 100 µm and a free area between 20% to 50% and wherein the filtering unit is provided with at least one outlet for the permeate of the filtering unit.

Preferred embodiments of the device of the invention are provided in FIG. 1. Preferably, the filter of the device according to the invention is a wire mesh.

The inventors found that optimal protein enrichment with regard to low fat recovery in the permeate were achieved upon applying filters with an opening size in the range 1 to 200 µm, preferably 4 to 100 µm, more preferably a filter with an opening of 40 µm to 100 µm, most preferably about 40 µm or an opening of about 100 µm. With such filters, oil droplets are efficiently kept out of the permeate, and filter clogging is kept to a minimum.

Preferably, the device according to the invention has a filter with an opening size in the range of 40 µm to 100 µm.

The device of the invention is construed to avoid any agitation, in order to apply minimal stress to the protein extracted from the vegetable source material. It is also part of the invention to prevent clogging of the filter of the device according to the invention. Clogging is already kept at minimal level by applying a flow at particularly low shear rate, i.e. a flow with a superficial average velocity of 0.1 to 10 mm per second, combined with a filter having an opening size adapted to the particle size of the vegetable source material. The inventors now found that it is even more preferred if the device of the invention is further equipped with vibration means for vibrating the closed container and/or for vibrating the filtering unit during protein extraction. When occasionally an opening of the filter starts to become clogged, vibration will release the occluding particle from the opening.

The device according to the invention preferably is provided with vibration means for vibrating the container and/or filtering unit, such that in operation clogging of the filter is avoided and agitation of the aqueous solution is avoided.

One of the many benefits of the device of the invention for use in the process of the invention, is its easy and ready scalability. In the examples, embodiments are provided for prototype 'ALSEOS' devices according to the invention, which devices operate adequately at 1.6, 1.9 and about 31 L scale. It is now an important benefit of the invention that the volume of the closed container is readily scaled-up to 100 L and more. Preferably, the device according to the invention thus has a container having a volume of between 0.1 m$^3$ and 100 m$^3$, preferably between 1 m$^3$ and 20 m$^3$, more preferably, between 1 m$^3$ and 10 m$^3$.

The inventors found that carefully selecting the ratio between the total area of the filters and the volume of the closed container in the device according to the invention, beneficially contributes to efficient accumulation of protein in the protein extract, and also contributes to rapid extraction, i.e. within 20 to 200 minutes, while keeping the volume of permeate at minimal levels. Of course, the inventors developed a device of the invention in which also the opening size of the filter is adapted to optimal speed, protein extraction efficiency, lowest shear rate suitably for not denaturing the protein structure, etc., together with said optimally chosen ratio.

Therefore, the device according to the invention preferably has a ratio between the total area of the filters and the volume of the closed container of between 2 m$^2$ per m$^3$ and 20 m$^2$ per m$^3$, preferably between 5 m$^2$ per m$^3$ and 15 m$^2$ per m$^3$.

The device according to the invention is construed for the process of the invention in such a way that tangential flow of the aqueous solution exerts as low shear stress to the protein solubilized from the particles as possible, while cross flow through the filter in order to retrieve permeate with the solubilized protein is still favorable for obtaining protein extract in a convenient time span, at low volume. For this, the inventors found that it is beneficial for the device of the invention to preferably apply a filtering unit having an internal volume of 0.05 $m^3$ to 10 $m^3$.

Thus, preferably, the device according to the invention has a filtering unit having an internal volume of 0.05 $m^3$ to 10 $m^3$.

It is part of the invention that the device according to the invention comprises a filtering unit consisting of a single filter. However, the inventors surprisingly found that the device is easily and readily scalable upon construing a filtering unit comprising more than 1 filter, e.g. up to 200 filters, or 12 filters. See also the embodiments of the invention in this regard, provided in the Examples and figures. Preferably, a filtering unit of the invention comprises multiple filters, oriented parallel relative to each other (see for an example of the invention, FIG. 1C). Thus, the device of the invention provides for means to shorten extraction time by applying more than one filter while keeping the volume of the closed container constant. Thus, the device of the invention also provides for means to increase the turn-over of the device, by increasing the volume of the closed container while concomitantly increasing the number of filters in a filtering unit.

Preferably, the device according to the invention has a container comprising 2 to 200, preferably 5-100, preferably 10-50 filtering units.

Figure 1:
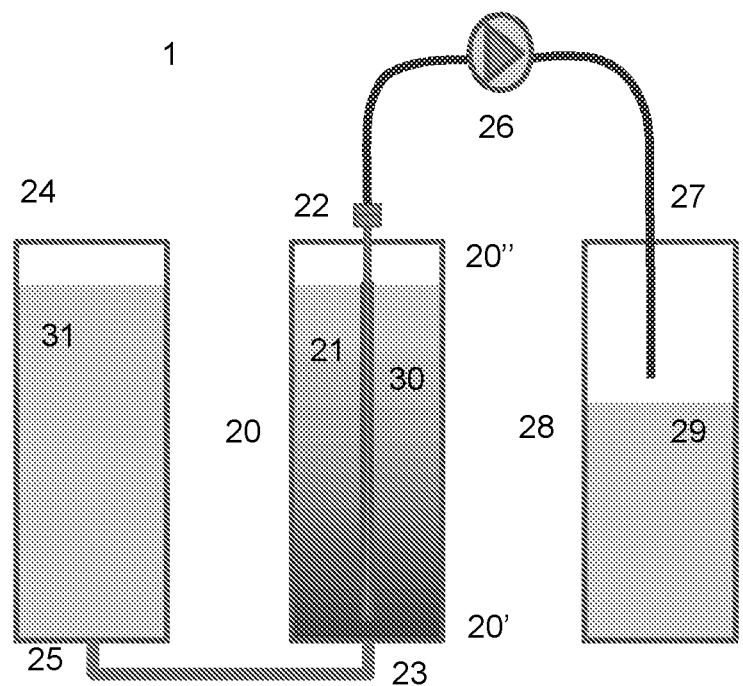
FIG. 1. Examples are provided of a device according to the invention and parts of such device for the process for preparation of a protein extract according to the invention. A. Device 1 for preparing a protein extract according to the invention. The device comprises a closed container 20, having a lower part 20' and an upper part 20", an inlet 23 connected via an outlet 25 with a second container 24, comprising aqueous solution 31, and said closed container comprising a filtering unit 21 with an outlet 22 located near the upper part of the closed container. The outlet 22 of the filtering unit is in connection with a pump 26, said pump connected to an inlet 27 in connection with a third container 28, for collecting protein extract 29. Closed container 20 comprises a mixture of aqueous solution with comminuted vegetable protein source material, such as oilseed meal. B. Example of a closed container 20 of a device 1 for preparing a protein extract according to the invention. The closed container has a cylindrical shape. The filtering unit 21 has a flat filter and the shape of a rectangular prism. C. An example of a closed container 20a having a rectangular prism shape. The closed container comprises more than one filtering unit, in this example 12 filtering units numbered 21-1, 21-2, . . . , 21-12. The combined filtering units are in connection with a collector pipe 47 at each side near the top side of the filtering units, each collector pipe having an outlet 22, as indicated. The closed container 20a is equipped with a bottom distributor plate 32, positioned at the bottom side of the closed container. D. Close-up side view of two filtering units 21-1 and 21-2 of a closed container 20a (See FIG. 1C.). Inlet 25 of the bottom distributor plate 32 is indicated. Arrows 40, 41 and 43 indicate the local superficial average velocity u at indicated positions in the fluidized bed of 0.1 mm per second (40), 0.5 mm per second (41) and u0 of 1 mm per second (43). The arrows 40, 41 and 43 and the vertical arrows starting from the bottom distributor plate indicate the tangential flow along the filtering units. The horizontal arrows along the filters indicate the cross flow of aqueous solution (comprising solubilized protein) through the filters. E. Example of a part of a filtering unit 21, comprising a supporting perforated sheet 33 (e.g. stainless steel, 2 mm thick, holes with diameter 2 mm, 23% open area), with the surface of the sheet layered at both sides with a layer of wire mesh cloth 34. F. Example of a closed container 20 comprising an inlet 25 for aqueous solution, further comprising a filtering unit 21, comprising an outlet 22 for collecting protein extract. Arrows 44, smaller from bottom to top, indicate the decreasing flow at the retentate side A of the closed container. Arrows 45, larger from bottom to top, indicate the increasing flow at the permeate side B of the filtering unit. Horizontal arrows in the closed container, near the filter indicate the cross flow of aqueous solution comprising solubilized protein from the mixture of comminuted meal or oil cake particles and aqueous solution 30. Vertical arrows in the closed container near the bottom indicate the tangential flow of aqueous solution. Arrow 46 indicates the level of aqueous solution in the closed container while in operation, i.e. during fluidized bed conditions. G. Close-up view of a filtering unit 21, having an outlet 22 at the permeate side, with a particle size gradient 30 of comminuted meal or oil cake particles in aqueous solution. Particle size in the aqueous solution in the fluidized bed range from larger particles 30" near the bottom side of the filtering unit to the smallest particles 30' near the top side of the filtering unit. Typically, droplets of oil (fat, lipids) are near the top side of the filtering unit, due to their lower density as compared to the aqueous solution. The filtering unit is for example micro-filtration cloth (wire mesh) having about 30% free area. The decreasing tangential flow 49 of aqueous solution at the retentate side of the closed container is indicated with the vertical arrows becoming smaller from bottom to top. The horizontal arrows 50 indicate the cross flow of aqueous solution comprising solubilized protein from the retentate side (R) to the permeate side (P) of the filter of the filtering unit. The outlet 22 of the filtering unit is connected to a collector pipe 47 via a clamp 48. Further filter units are preferably connected to the collector pipe using similar means for connecting. For a prototype ALSEOS device of the invention, preferably the collector pipe has in internal diameter of about 40 mm. The permeate side of the filtering unit is preferably substantially free of oil droplets (lipids, fat), that is to say the lipid fraction is below 10 w/w % (as per dry weight) and preferably lower.
Figure 1:
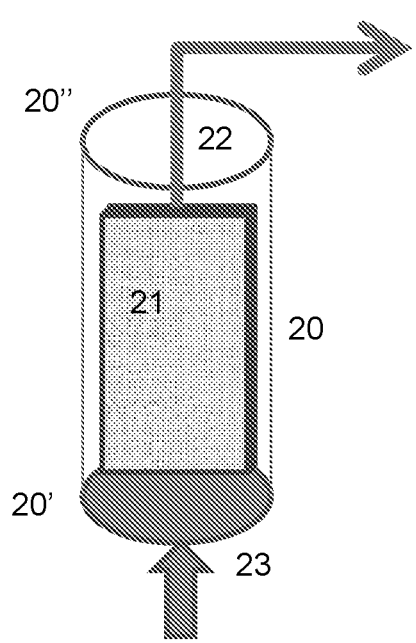
Figure 1:
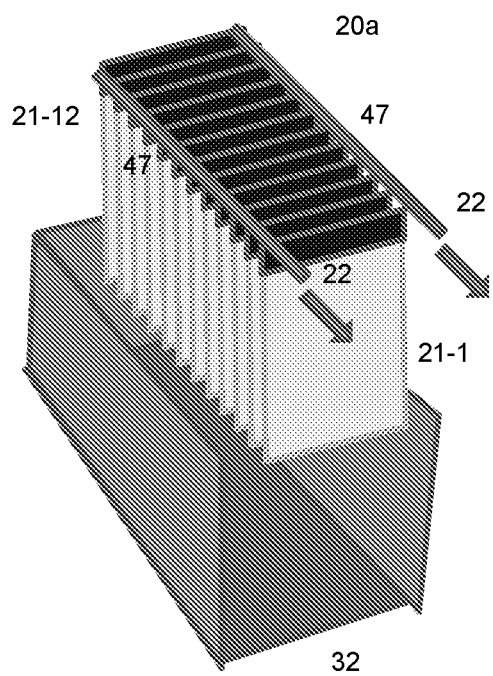
Figure 1:
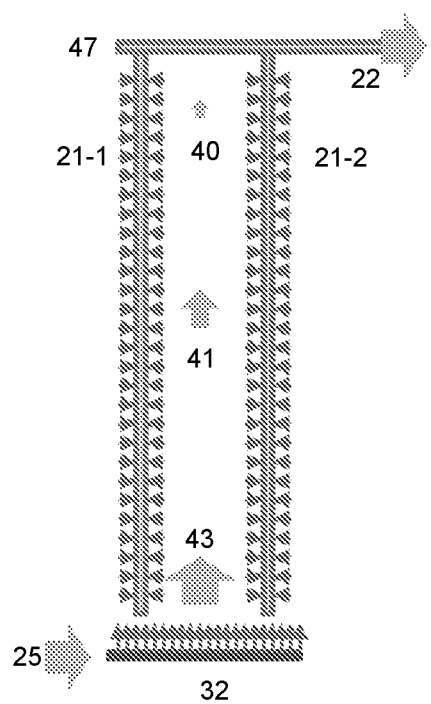
Figure 1:
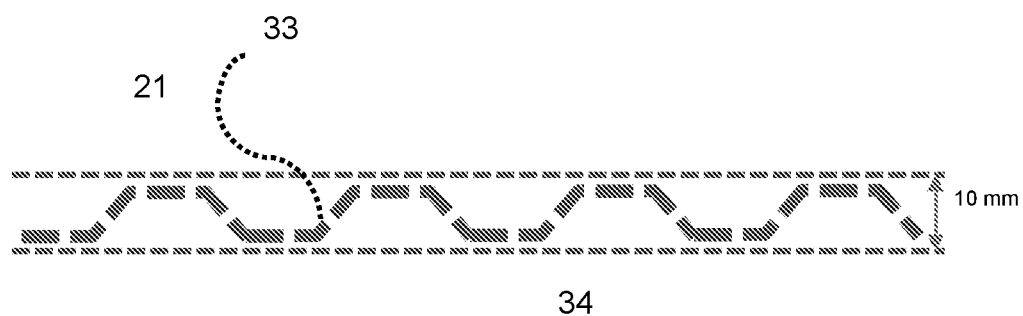
Figure 1:
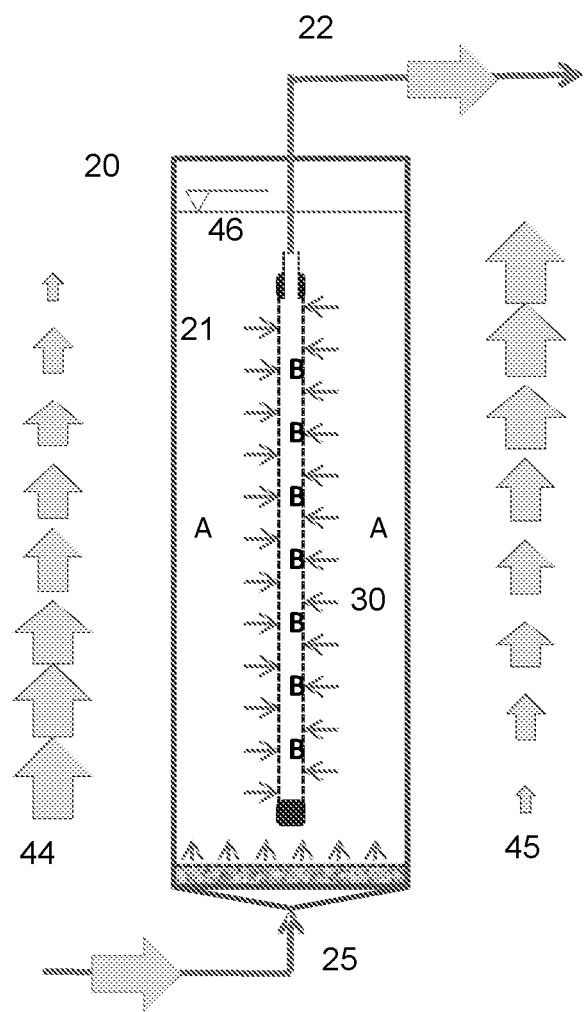
Figure 1:
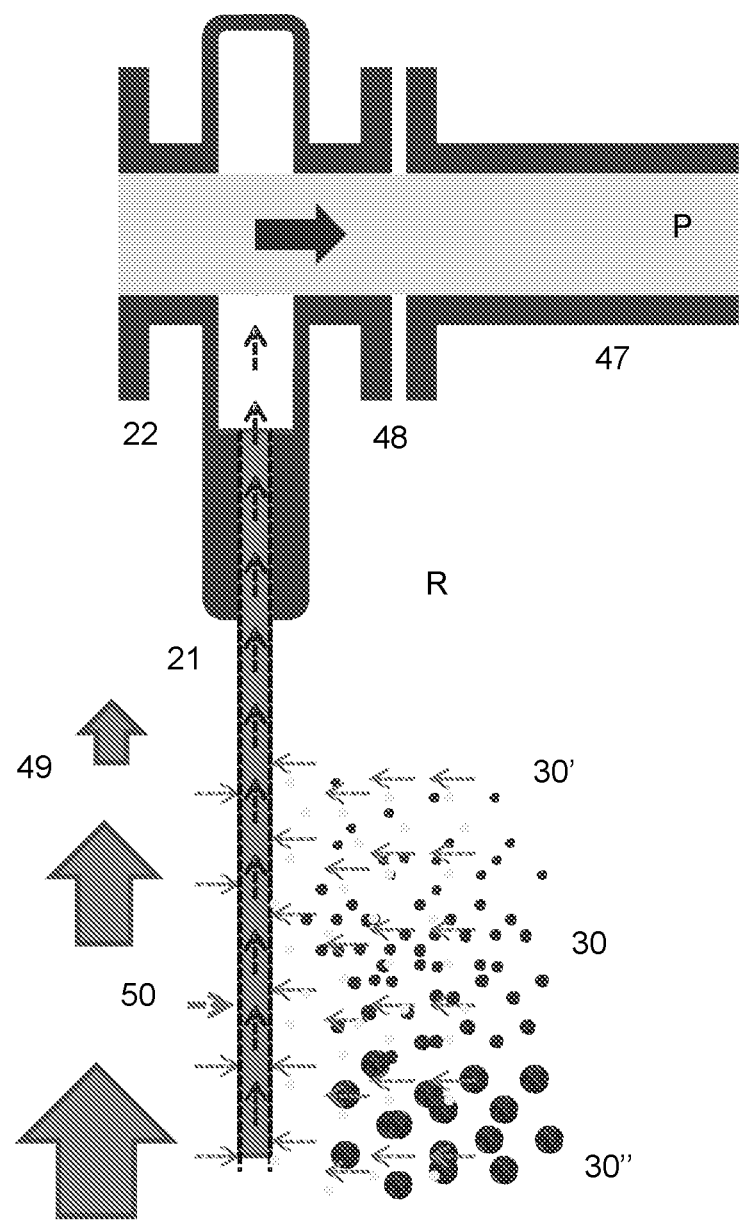

The present invention will be illustrated further by means of the following non-limiting Examples.

EXAMPLES

In all examples the starting material and the samples of Crude Extract (obtained with ALSEOS device, according to the invention) and Supernatant (obtained in stirred tank, using a conventional process in accordance to the prior art) were analyzed according to the analytical methods described below.

Analytical Methods for Crude Extract and Supernatant Samples

Protein Content

Protein content was determined by Kjeldahl method according to AOCS Official Method 991.20 Nitrogen (Total)

Milk. A conversion factor of 6.25 was used to determine the amount of protein (% (w/w)).

Dry Matter Content

Dry matter content was determined by a dryer method. The container with a cover, baguette and pre-weighed sand (sea sand washed with water, hydrochloric acid and calcined) of 20 grams (weights recorded to the nearest 0.1 g) was placed into a dryer pre-heated to temperature of 105° C.±2° C. and dried for about 2 hours until constant weight was recorded. At this time, the container was sealed and transferred to a desiccator, cooled to room temperature and weighed (weights were recorded to the nearest 0.001 g). A sample of 2 g±0.001 g was weighed and placed into the container. The container was covered and inserted into a dryer kept at temperature of 105° C.±2° C. The cover of the container was removed and dried for 3 h. After 3 h of drying the container was capped and transferred to a desiccator and cooled down to room temperature (cooling time of 30-45 min.). After this time, the container with the dried sample and sand was weighed. The dry matter content X (%) was calculated by the formula:

$$X = \frac{a-b}{c} \times 100\%$$

Calculations:

a—mass of the container with the test sample and sand before drying (g);

b—mass of the container with the test sample and sand after drying (g);

c—mass of the container with sand (g).

The final result is the arithmetic mean of at least two measurements that do not differ by more than 0.2%. The result is rounded to 0.1.

Fat Content

The fat content was determined by the Gerber method according to PN-ISO 2446:2010 (Reference: *Milk—Determination of fat content*—Gerber butyrometer, pages 1-18.)

Analytical Methods for Starting Material dried filter was transferred to the extraction thimble. Thimble and filter paper were placed in a semi-automatic Soxtec Avanti 055. The extraction process was carried out according to the instructions of the apparatus.

Extraction cycle consists of three phases:

The first phase of the process: pre-cooking the sample in petroleum ether, boiling temperature 40-60° C., duration 15 minutes Second phase of the process: main extraction, duration 45 minutes Third phase of the process: fat recovery, duration 20 minutes.

The aluminum container with the sample was dried in a dryer heated to temperature 100-102° C. for 1 h. Afterwards the container was transferred to a desiccator and subjected to cooling for ca. 30-45 minutes). After this time aluminum container with the sample was weighed (weighed to the nearest 0.0001 g).

The fat content (X) in the sample was calculated as % according to the formula:

$$X = \frac{a-b}{c} \times 100\%$$

where:

a—mass of the aluminum container with the sample after drying (g);

b—mass of the aluminum container after drying (g)

c—mass sample (g)

As the final result should be the arithmetic mean of at least two X differs by not more than 0.2%.

Moisture Content

A sample (2±0.5 g) was placed in the moisture analyzer (RadWag WPS 110S) in temperature 105° C. Moisture content was determined from the difference in the sample weight before and after drying.

| | Total Protein content | Fat content | Moisture content |
|---|---|---|---|
| Rapeseed cake | The same method as described above | Soxhlet method, see below | Moisture analyzer, see below |
| Soya bean cake and sunflower cake | Kjeldahl method (Nx 6.25) according to CLA/PSO/13/2013, version 3, 19.12.2013 r. by Central Agro-ecological Laboratory of University of Life Sciences in Lublin | Soxhlet method according to CLA/PSO/10/2013, version 4, 06.08.2013 by Central Agro ecological Laboratory of University of Life Sciences in Lublin | Moisture analyzer, see below |

Fat Content, Soxhlet Method

Sample was placed into a mortar and ground with a pestle into a homogeneous mass. About 5 g±0,001 g of prepared sample was weighed in Erlenmeyer flask. 45 cm³ of boiling distilled water was added. After stirring 55 cm³ 25% HCl was added. The flask was combined with a reflux condenser and heated to reflux for 15 minutes. After this time, coolers were rinsed with 100 cm³ of boiling distilled water. Erlenmeyer flask contents were quantitatively transferred to filter paper. The residue on the filter was washed with distilled water at 60° C. to wash out the chloride (Check with acidified using HNO₃ solution AgNO₃). Afterwards the filter with its content was placed on a watch glass and dried. The Example 1

Preparation of a Protein Extract from Rapeseed Cake by Means of ALSEOS 1.0 Prototype, in Accordance to the Invention.

In this example the protein extraction process of the invention was performed with an ALSEOS 1.0 prototype device (Column Volume=1.57 L or 1.96 L; See FIG. 1F), according to the invention. The filter element 21 is in the form of tube or pipe made of perforated stainless steel with free area (aperture 50%) and diameter of the holes 5 mm. The diameter of the tube is 16 mm, the length is 800 mm. Around this tube the filter cloth is wrapped. The filter cloth is made of stainless steel wire mesh. Different cloths were applied in the Examples, having different opening sizes: 4 µm, 40 µm and 100 µm. Aperture (free area of the cloth) was about 30% for all of these cloth fabricates. The filter element is positioned in a Column (Borosilicate glass) with an inner diameter of 50 mm, and with a distributor plate 32.

Two columns were used:
ALSEOS 1.0 ID 50 mm; H=850 mm; VOL=1.56 L
ALSEOS 1.0*ID 50 mm; H=1000 mm; VOL=1.97 L.

The working principle of the device is formation of the fluidized bed from comminuted material of vegetable origin, from which the filtrate (Crude Extract) is withdrawn by means of a filtering unit submerged in the fluidized bed suspension. Vegetable sources were rapeseed cake, soybean cake and sunflower cake. Protein recovery and fat recovery were analyzed.

Procedure

Process conditions are summarized in Table 1.

Prior to charging into the ALSEOS device, the starting material was comminuted in the mixer-grinder (Thermomix, Vorwerk) and sieved to get the required particle size distribution, as given in Table 1. The pre-treated starting material was then gently mixed, using a spoon, with aqueous salt solution (2% NaCl (w/w), ratio liquid/solid (L/S)=4+/−2%) in a container for the period of less than about 10 min. Meantime pH of the suspension was adjusted to reach target pH=7.0 (6.8-7.2).

Figure 2:
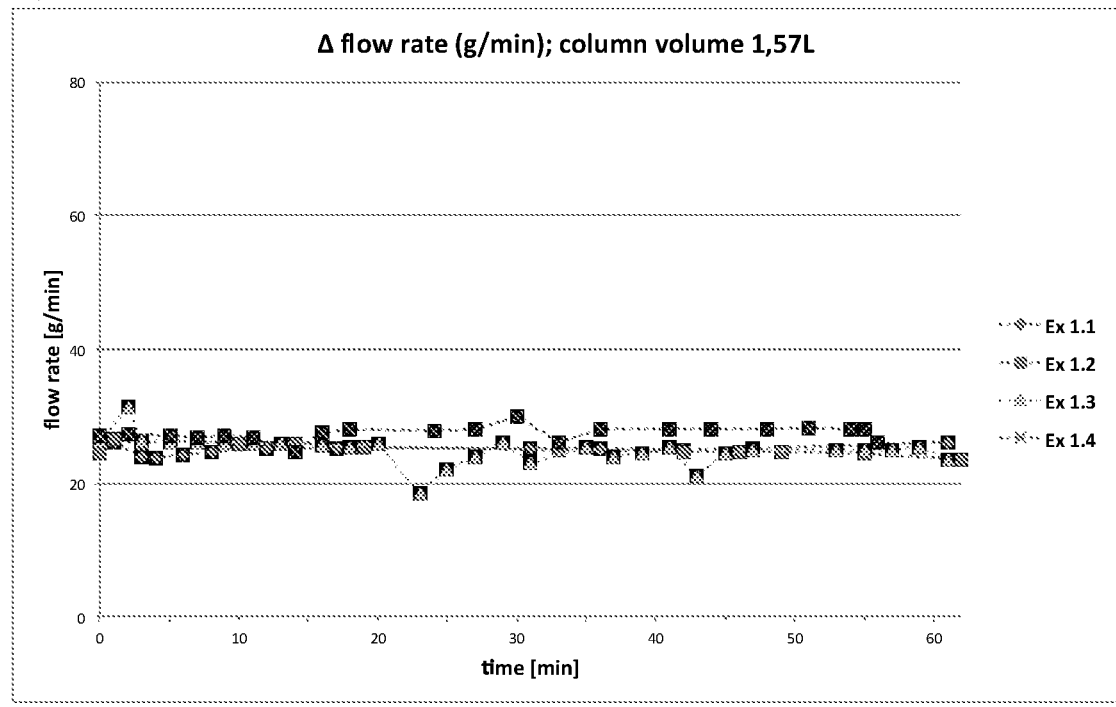
FIG. 2. A. Flow rate profile of permeate in ALSEOS 1.0—Experiments #1.1-1.4. B. Flow rate profile of permeate in ALSEOS 1.0*—Experiments #1.5-1.11.
Figure 2:
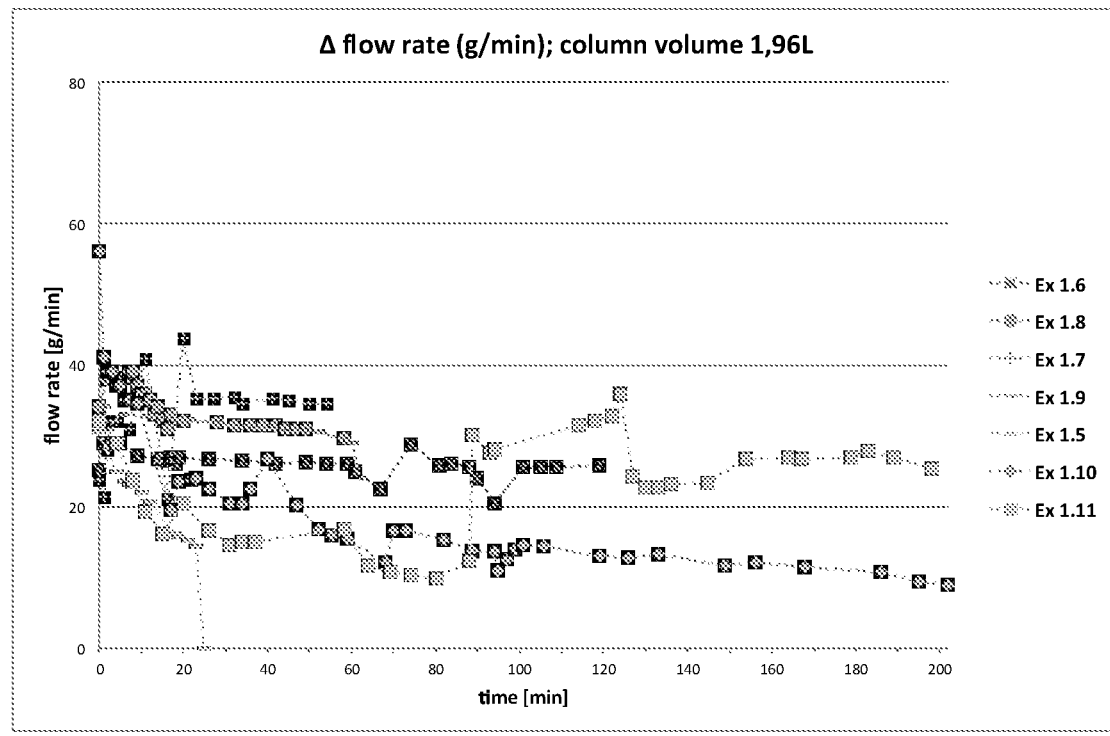
Figure 3:
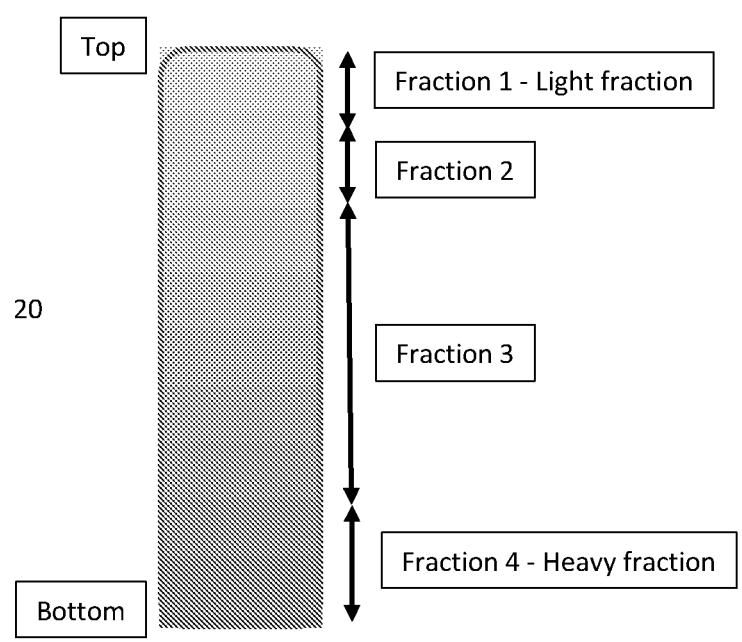
FIG. 3. Fractions observed in Experiment #2.1, from top to bottom in the ALSEOS device according to the invention.

1) The suspension was loaded into the column, which was pre-filled with aqueous salt solution up to 5 cm from the column bottom. When the column was pre-filled with approximately ⅓ of the column volume, flow of aqueous salt solution was started through the distributor at the bottom of the column.
2) Flow of aqueous salt solution to ALSEOS and outflow of permeate (extract) from ALSEOS were controlled by a peristaltic pump. A circulation thermostat controlled temperature in the whole system.
3) The duration of the extraction time was registered as given in Table 1. Weight measurements in time were taken in order to obtain the flow rate profile (FIG. 2A for ALSEOS 1.57 L Column Volume, and FIG. 2B for ALSEOS 1.96 L Column Volume).
4) The Crude Extract was sampled and analyzed for dry matter (expressed as % w/w), Total Protein concentration (Kjeldahl Nx6.25), and fat concentration.
5) Additional samples of Crude Extract were taken in Experiment #1.11, after 0.5 column volume (CV) of extract was collected (after about 30 min), after 1 CV (after about 65 min.), after 1.5 CV (after about 165 min.), and after 2 CV (after about 199 min).

TABLE 1

Overview of experiments and corresponding process conditions and process outputs with ALSEOS 1.0 Prototypes

| | Ex 1.1 | Ex 1.2 | Ex 1.3 | Ex 1.4 | Ex 1.5 | Ex 1.6 | Ex 1.7 | Ex 1.8 | Ex 19 | Ex 1.10 | Ex 1.11 |
|---|---|---|---|---|---|---|---|---|---|---|---|
| starting material | rapeseed cake | rapeseed cake | rapeseed cake | rapeseed cake | rapeseed cake | rapeseed cake | rapeseed cake | sunflower cake | soya bean cake | soya bean cake | rapeseed cake |
| Information on ALSEOS 1.0 | | | | | | | | | | | |
| Alseos Type | 1.0 | 1.0 | 1.0 | 1.0 | 1.0* | 1.0* | 1.0* | 1.0* | 1.0* | 1.0* | 1.0* |
| Column Volume, CV (L) | 1.57 | 1.57 | 1.57 | 1.57 | 1.96 | 1.96 | 1.96 | 1.96 | 1.96 | 1.96 | 1.96 |
| Filter mesh opening size (Alseos 1.0) (um) | 100 | 100 | 40 | 40 | 4 | 100 | 100 | 40 | 40 | 40 | 100 |
| Process conditions | | | | | | | | | | | |
| Particle size starting material (um) | 800-1000 | 0-200 | 800-1000 | 0-200 | 0-200 | <1000 | <1000 | <1000 | <1000 | <400 | <1000 |
| NaCl concentration (w/w %) | 2 | 2 | 2 | 2 | 2 | 2 | 2 | 2 | 2 | 2 | 2 |
| Temperature (° C.) | 15 | 15 | 15 | 15 | 15 | 15 | 22 | 22 | 22 | 22 | 15 |
| Liquid/Solid ratio (L/S) | 4 | 4 | 4 | 4 | 4 | 4 | 4 | 4 | 4 | 3.5 | 4 |
| Load starting material (g) | 314 | 314 | 314 | 314 | 393 | 393 | 393 | 393 | 393 | 315 | 393 |
| Amount of aqueous salt solution for preparation of the suspension (g) | 1256 | 1256 | 1256 | 1256 | 1570 | 1570 | 1570 | 1570 | 1570 | 1114 | 1570 |
| Process output | | | | | | | | | | | |
| Extraction time (min) | 62 | 63 | 62 | 57 | 24 | 120 | 57 | 60 | 63 | 203 | 199 |
| Amount of Crude Extract collected (g) | 1570 | 1570 | 1571 | 1570 | 344 | 3285 | 1963 | 1969 | 1967 | 3126 | 3926 |

ALSEOS 1.0 Column H=800 mm, ID=50 mm volume 1.57 L

ALSEOS 1.0*Column H=1000 mm, ID=50 mm volume 1.96 L

Experiments with Stirred Vessels, According to Prior Art.

The process performed in the device according to the invention was compared with the conventional mode of protein extraction (Experiments 1.12 and 1.13), in a stirred vessel, applying (intensive or gentle) stirring of the particles derived from the vegetable source, i.e. comminuted cake.

Procedure

Process conditions are summarized in Table 2.

1) Rapeseed cake was comminuted in a mixer-grinder (Thermomix, Vorwerk) and sieved to generate the desired particle size distribution, as indicated in Table 2.

2) In the extraction experiments 100 g of comminuted rapeseed cake was used.

3) The material was suspended in 400 g of the extraction medium (aqueous salt solution NaCl 2% w/w solution). The temperature of the extraction medium was adjusted to the process temperature prior to each experiment. The pH of the suspension was adjusted to pH 7.0 (range: 6.8-7.2). Extraction was performed in a 1 L-jacketed Radley's glass reactor under conditions of 'intensive stirring', i.e. stirring at 1.290 rpm, with an anchor mixer (Experiment 1.12), vs. conditions of 'gentle stirring', i.e. stirring at 5 rpm, with an anchor mixer, to just suspend the particles (Experiment 1.13).

4) The process duration and temperature were adjusted for each experiment, as shown in Table 2.

5) Post extraction, the material was transferred to 500 mL centrifugation bottles and centrifuged in Beckham centrifuge (SER 90E, rotor type JA10) for 10 min, at 3000*g.

6) After centrifugation the extract was gently decanted i.e. without disturbing the top fat layer that was formed in the upper part of the bottle.

7) Weight measurements were taken for mass balance calculations.

8) The decanted Supernatant was sampled and analyzed for dry matter %, Total Protein concentration (Kjeldahl Nx6.25), and fat concentration.

TABLE 2

Overview of experiments and corresponding process conditions and process outputs with stirred vessel

| | Experiment # | |
|---|---|---|
| | Ex 1.12 | Ex 1.13 |
| Starting material | rapeseed cake | rapeseed cake |
| Process conditions | | |
| Volume stirred vessel (L) | 1 | 1 |
| Information on mixing intensity | intensive mixing, 1.290 rpm | gentle mixing, just suspended conditions, 5 rpm |
| particle size starting material (μm) | 0-200 | 0-200 |
| NaCl concentration (w/w %) | 2 | 2 |
| Temperature (° C.) | 15 | 15 |
| Extraction time (min) | 60 | 60 |
| Liquid/Solid ratio (L/S) | 4 | 4 |
| Load starting material (g) | 100 | 100 |
| Amount of aqueous salt solution for preparation of the suspension (g) | 400 | 400 |
| Process output | | |
| Extraction time (min) | 60 | 60 |
| Amount of Supernatant collected, after centrifugation (g) | 265 | 217 |

*Jacketed glass reactor: Radley's Reactor-Ready Lab 1L with RS 100 Overhead Stirrer (PTFE Anchor)

Results

Table 3 summarizes the characteristics of the starting material, which was used in Experiments 1.1-1.13. The process differences are summarized in Table 4.

TABLE 3

Information about starting material

| Experiment # | Staring material | Source | Information starting material | DW (%) | Total Protein (% DW) | Fat (% DW) |
|---|---|---|---|---|---|---|
| Ex 1.1-Ex 1.7, Ex 1.12 | Rapeseed cake | Agro-Food Ent. Rutkowski | Process temp. in oil production process max. 73° C. | 91 | 31 | 17 |
| Ex 1.8 | Sunflower cake | Agrotrade Enterprise | Process temp. in oil production process >100° C. | 93 | 51 | 7 |
| Ex 1.9, Ex 1.10 | Soya cake | Agrotrade Enterprise | Process temp. in oil production process >100° C. | 94 | 26 | 14 |
| Ex 13 | Rapeseed cake | Pilot-scale installation, Prof. Tys from Lublin | Process temp. in oil production process max. 40° C. | 92 | 31 | 23 |

TABLE 4

Summary of process parameter differences

| Starting material | Experiment # | Extraction device | Particle size (μm) | Temp. (° C.) | Filter mesh opening size (in ALSEOS 1.0) (μm) | Extraction time |
|---|---|---|---|---|---|---|
| Rapeseed cake | Ex 1.1 | ALSEOS 1.0 | 800-1000 | 15 | 100 | 62 |
| Rapeseed cake | Ex 1.2 | ALSEOS 1.0 | 0-200 | 15 | 100 | 63 |
| Rapeseed cake | Ex 1.3 | ALSEOS 1.0 | 800-1000 | 15 | 40 | 62 |
| Rapeseed cake | Ex 1.4 | ALSEOS 1.0 | 0-200 | 15 | 40 | 57 |
| Rapeseed cake | Ex 1.5 | ALSEOS 1.0 | 0-200 | 15 | 4 | 24 |
| Rapeseed cake | Ex 1.6 | ALSEOS 1.0 * | <1000 | 15 | 100 | 120 |
| Rapeseed cake | Ex 1.7 | ALSEOS 1.0 * | <1000 | 22 | 40 | 57 |
| Sunflower cake | Ex 1.8 | ALSEOS 1.0 * | <1000 | 22 | 40 | 60 |
| Soya bean cake | Ex 1.9 | ALSEOS 1.0 * | <1000 | 22 | 40 | 63 |
| Soya bean cake | Ex 1.10 | ALSEOS 1.0 * | <400 | 15 | 40 | 203 |
| Rapeseed cake | Ex 1.11 (0.5 CV) | ALSEOS 1.0 * | <1000 | 15 | 100 | 30 |
| Rapeseed cake | Ex 1.11 (1 CV) | ALSEOS 1.0 * | <1000 | 15 | 100 | 65 |
| Rapeseed cake | Ex 1.11 (1.5 CV) | ALSEOS 1.0 * | <1000 | 15 | 100 | 165 |
| Rapeseed cake | Ex 1.11 (2CV) | ALSEOS 1.0 * | <1000 | 15 | 100 | 203 |
| Rapeseed cake | Ex 1.12 | stirred vessel | 0-200 | 15 | intensive mixing | 60 |
| Rapeseed cake | Ex 1.13 | stirred vessel | 0-200 | 15 | gentle mixing | 60 |

The analytical data obtained for the Crude Extracts and Supernatants and the process recoveries for Experiments 1.1-1.13 are summarized in Table 5.

TABLE 5

Results of protein extraction experiments using the process according to the invention with a device of the invention, compared to conventional methods. (Analytical data refer to Crude Extracts (Ex. 1.1-1.11) and Supernatant (Ex. 1.12 and 1.13), recoveries are calculated for the extraction step)

| Starting material | Experiment # | Dry weight (DW) (%) | Fat (% DW) | Fat Recovery % | Total Protein (Nx6.25) (% DW) | Total Protein Recovery % | Fat/Protein ratio in Crude Extract or Supernatant (g DW/g DW) |
|---|---|---|---|---|---|---|---|
| Rapeseed cake | Ex 1.1 | 4.4% | 2.3% | 3.2% | 45.5% | 35.2% | 0.05 |
| Rapeseed cake | Ex 1.2 | 5.9% | 5.1% | 9.7% | 47.0% | 48.7% | 0.11 |
| Rapeseed cake | Ex 1.3 | 5.5% | 3.6% | 6.3% | 33.9% | 31.8% | 0.11 |
| Rapeseed cake | Ex 1.4 | 3.7% | 5.5% | 6.5% | 39.3% | 25.3% | 0.14 |
| Rapeseed cake | Ex 1.5 | 8.7% | 7.0% | 3.5% | 40.9% | 11.0% | 0.17 |
| Rapeseed cake | Ex 1.6 | 4.4% | 3.4% | 7.6% | 30.3% | 37.0% | 0.11 |
| Rapeseed cake | Ex 1.7 | 6.8% | 3.0% | 6.5% | 26.8% | 32.1% | 0.11 |
| Sunflower cake | Ex 1.8 | 4.3% | 2.3% | 9.2% | 13.8% | 7.2% | 0.17 |
| Soya bean cake | Ex 1.9 | 3.8% | 0.7% | 1.0% | 23.4% | 18.3% | 0.03 |

TABLE 5-continued

Results of protein extraction experiments using the process according to
the invention with a device of the invention, compared to conventional methods.
(Analytical data refer to Crude Extracts (Ex. 1.1-1.11) and Supernatant (Ex. 1.12 and
1.13), recoveries are calculated for the extraction step)

| Starting material | Experiment # | Dry weight (DW) (%) | Fat (% DW) | Fat Recovery % | Total Protein (Nx6.25) (% DW) | Total Protein Recovery % | Fat/Protein ratio in Crude Extract or Supernatant (g DW/g DW) |
|---|---|---|---|---|---|---|---|
| Soya bean cake | Ex 1.10 | 6.7% | 0.0% | 0.0% | 10.8% | 29.2% | 0.00 |
| Rapeseed cake | Ex 1.11 (0.5 CV) | 8.4% | n.a | n.a | 40.4% | 16.9% | n.a |
| Rapeseed cake | Ex 1.11 (1 CV) | 6.7% | n.a | n.a | 36.0% | 42.7% | n.a |
| Rapeseed cake | Ex 1.11 (1.5 CV) | 5.7% | n.a | n.a | 33.9% | 50.8% | n.a |
| Rapeseed cake | Ex 1.11 (2CV) | 4.9% | 3.1% | 9.7% | 32.3% | 55.7% | 0.10 |
| Rapeseed cake | Ex 1.12 | 15.3% | 26.1% | 68.6% | 41.0% | 58.5% | 0.64 |
| Rapeseed cake | Ex 1.13 | 9.8% | 3.1% | 3.1% | 50.0% | 37.3% | 0.06 |

Conclusions from Experiments Performed in the ALSEOS 1.0 Device
1) The results obtained show by and large, the benefits of the ALSEOS process and device. The yield on protein is high and the oil/lipids are mainly retained at the retentate side of the filter. It was demonstrated that about 50% of proteins present in the starting material have been recovered in the Permeate in some of the experiments. At the same time most of the fat present in the starting material has been retained on the Retentate side. Expressed as the ratio Fat:Protein, the ratio is significantly lower in the Permeate (about 0.1) than in the starting material (about 0.5).
2) Protein extract was obtained for tested process conditions according to the invention. A stable flux of permeate was maintained throughout the process time. That shows good hydrodynamic performance of ALSEOS device. For Experiment #1.5, in which 4 μm filter mesh opening size was applied, flux was observed for 24 min process time due. This indicates the need to optimize the mesh opening size when longer process time is required, which mesh opening size should be adapted to the specific granulometric properties of staring material in order to prevent fouling of the filtering device. A person skilled in art will know that increasing the filter area will also facilitate more stable process and less fouling of the filter mesh.
3) For rapeseed cake the highest protein recovery (55.7%) was obtained in Experiment 11, for the process conditions of <1000 μm particle size, 100 μm filter mesh opening size and, 15° C. extraction temp, 203 minutes extraction time, where 2 Column Volume of permeate were collected. That clearly shows the added value of the increased contact time of the starting material with the aqueous salt solution, as compared to the protein recovery obtained in e.g. example 1.6, with the same process conditions except for the shorter contact time of 120 min.
4) In all cases fat recovery was lower than 10%, meaning that 90% of the fat was retained on the retentate side.
5) The lowest fat recovery was obtained in Experiment 1.1 for the process conditions of 800-1000 μm particle size, 100 μm filter mesh opening size and, 15° C. extraction temperature, 60 minutes extraction time.
6) Fat recovery in Experiment 1.1 was lower as compared to the Experiment 1.2 in which rapeseed cake was ground to smaller particle size of 0-200 μm. However, in experiment 1.2 higher protein recovery (48.7%) was obtained as compared to Experiment 1.1 (35.2%). That indicates that mass transfer conditions for protein recovery are favorable when particles are smaller. However, smaller particle size favors fat release during extraction, most probably because the comminution of rapeseed cake also breaks down oil bodies in rapeseed cake, what enables release of fat.
7) Devices of the invention comprising filters with 40 μm filter mesh opening size and with 100 μm filter mesh opening size are both particularly suitable for the process according to the invention; devices with these filters provide for low fat recoveries combined with high protein recovery and suitable hydrodynamics, i.e. less prone to fouling compared to tight filter mesh opening size (4 μm, in Experiment 1.5).
8) In experiment 1.11 the benefit of the prolonged contact time of rapeseed cake with extraction medium on protein recovery is seen. In this experiment samples of Crude Extract were withdrawn when the amount of collected Crude Extract reached 0.5 CV (corresponding to 30 minutes contact time), 1 CV (65 minutes contact time), 1.5 CV (165 minutes contact time), and 2 CV (199 minutes contact time). The protein recovery increased as follows: 16.9% (0.5 CV), 42.7% (1 CV), 50.8% (1.5 CV), and 55.7% (2 CV).

Conclusions Elucidated from Experiments with Stirred Vessels
1) Fat recoveries were below 10% when comparing all experiments with ALSEOS 1.0 device with the lowest being 3.2% in Experiment 1.1. When a conventional stirred tank vessel with gentle mixing was used (Experiment 1.13) fat recovery was comparable, being 3.1%. That shows the advantage of ALSEOS device, as in case of the stirred tank low fat recovery was due to the centrifugation step which was performed after extraction. In case of ALSEOS centrifugation was not needed and comparable fat recovery was obtained. To explain this phenomenon, it is of paramount importance to understand that it is shear forces that are responsible for the release of fat into the liquid phase during co-extraction of proteins in the presence of fat. The level of shear in the ALSEOS device is lowest possible of all known devices in the art, with which the process of extraction of oilseeds can be performed. Shear rates in stirred vessels are in the range 100-1000 per second, to be compared with shear rates of <10 per second in the expanded (fluidized) bed according to the invention, which is thus the case in the prototype ALSEOS devices exemplified in the current examples. Shear rates in the conventional packed bed aimed for percolation extraction known in the art are in the range 10-100 per second [Carta G, Jungbauer, 2010].

At industrial scale the conditions in stirred tank vessel will rather resemble the conditions mimicked in the small-scale vessel by providing the intensive mixing (Experiment 1.12). This because it is expected that the maximum shear rates in the stirred vessels will be an order of magnitude higher than average shear rates in the reactor, as reported in the literature [Camperi A., et al., 2008; Villadsen J, Liden G; 2003].

2) When comparing fat recoveries obtained in Example 1.2 according to the invention (ALSEOS 1.0 device) with fat recovery obtained in Example 1.12 (stirred vessel, intensive mixing), the advantage of a low shear extraction, which is provided by means of ALSEOS device, is demonstrated in terms of low fat recovery—9.7% fat recovery in Experiment 1.2, vs. 68.6% fat recovery in Experiment 1.12.

Experimental Materials

All starting material was stored at room temperature. After milling the pre-treated materials were stored in the fridge (2-8° C.). Samples of Crude Extracts and Supernatants were frozen (−20° C.) and defrosted prior to analytical testing.

Key Equipment

ALSEOS 1.0 (experiment # Ex 1.1-1.4): Column Kron-Lab, vol. 1.57 L ((YMC-ECO50/750M0VK) and ALSEOS 1.0*(experiment # Ex. 1.5-1.11) vol. 1.96 L (YMC-ECO50/999M0VK) with the filter mesh opening size 100 μm, 40 μm and 4 μm Peristaltic pump (experiment # Ex. 1.1-1.4): Ismatec Ecoline with head pump MS/CA 4-12

Peristaltic pump (experiment # Ex. 1.5-1.11): Lead Fluid BT-100S with head pump DG-4

Thermostat (experiment # Ex 1.1-1.4): LabTech RH40-25A Circulator

Thermostat (experiment # Ex. 1.5-1.11): Huber Unichiller 150Tw-H

Jacketed glass reactor (experiment # Ex. 1.12-1.13): Radley's Reactor-Ready Lab 1 L with RS 100 Overhead Stirrer (PTFE Anchor)

Centrifuge (experiment # Ex. 1.12-1.13): Beckman SER 90E with rotor type JA10

Example 2

Preparation of a Protein Extract from Rapeseed Cake by Means of ALSEOS 2.0, a Device of the Invention In this example the protein extraction process of the invention was performed with an ALSEOS 2.0 prototype device (column volume=31.4 L, filter mesh opening size 100 μm according to the invention). For the ALSEOS 2.0 (31.4 L) Prototype the filter element was in the form of a frame, covered (both sides) by filter cloth (FIG. 1E). The column diameter was 200 mm and the height 1000 mm. Column volume about 30 L. The same filter cloth 4 μm and 100 μm was applied as for ALSEOS 1.0 (See Example 1). The working principle of the device is formation of the fluidized bed from rapeseed cake.

Procedure:

Process conditions are summarized in Table 6. An ALSEOS prototype protein extraction device (column) was pre-charged with water (tap water, temperature about 15° C., no salt added). Inlet of water to the device was through a distributor plate at the bottom of the column. Flow velocity was about 30 L/h. Rapeseed cake was comminuted in the mixer (Zelmer ZSB, 1400 B) and sieved to get the size of <2000 μm. 1.5 kg of comminuted rapeseed cake was pre-mixed in a bucket with about 8 kg of water. Gentle swirling was applied by planetary movement of the closed bucket (by hand), for about 1 minute, to avoid excessive agitation. The content of the bucket was then poured into the ALSEOS prototype column via a funnel and through the ball valve in the top lid of the column. A second portion of comminuted 1.5 kg rapeseed cake was prepared in a similar way and poured to the ALSEOS prototype column. Water was continuously supplied to the ALSEOS prototype column during charging the container with the cake slurry. Feed rate of the water supply was about 30 L/h. When the liquid level was approaching the top lid of the column, the venting valve of the container was kept open allowing portion of the content of the column (about 5 L) to be discharged to a waste container. Thereafter, the vent valve was closed and the only outlet for liquid from the column device is on the permeate side of the filter of the filtration means. Filtrate (permeate) from the ALSEOS device was collected in a separate filtrate container.

Samples of the filtrate (Crude Extract) were analyzed for dry weight, Total Protein and fat content.

Results

Fractionation of the retained material on the retentate side of the filter was observed, with a 'light' fraction (relatively low particle density; lipid rich) accumulating at the top of the ALSEOS column (closed container) and a 'heavy' fraction (relatively high particle density containing less lipids and more hulls) residing in the bottom part of the column.

TABLE 6

Overview of experiments and corresponding process conditions and process outputs with ALSEOS 2.0

|  | # Experiment Ex 2.1 |
|---|---|
| starting material | rapeseed cake |
| Information on ALSEOS 2.0 | |
| Alseos Type* | 2.0 |
| Column Volume, CV (L) | 31.4 |
| Filter mesh opening size (Alseos 2.0) (μm) | 100 |
| Process conditions | |
| Particle size starting material (μm) | <2000 μm |
| Temperature (° C.) | ca. 15 |
| Liquid/Solid ratio (L/S) | 10 |
| Load starting material (kg) | 3 |

TABLE 6-continued

Overview of experiments and corresponding process conditions and process outputs with ALSEOS 2.0

| | # Experiment Ex 2.1 |
|---|---|
| Process output | |
| Extraction time (minutes) | 51 |
| Amount of Crude Extract collected (kg) | 18 |

*ALSEOS 2.0 Column H = 1000 mm, ID = 20 cm, volume 31.4 L

TABLE 7

Information about the starting material

| Experiment # | Starting material | Information starting material | Source | DW (%) | Total Protein (% DW) | Fat (% DW) |
|---|---|---|---|---|---|---|
| Ex 2.1 | Rapeseed cake | Process temp. in oil production process >100° C. | Z.T. Bielmar | 91% | 32% | 9% |

TABLE 8

Results of protein extraction experiments using the process according to the invention with a device of the invention, compared to conventional methods. (Analytical data refer to Crude Extract, recoveries are calculated for the extraction step)

| Experiment # | Starting material | Dry weight (DW) (%) | Fat (% DW) | Fat Recovery % | Total Protein (Nx6.25) (% DW) | Total Protein Recovery % | Fat/Protein ratio Crude Extract (g DW/g DW) |
|---|---|---|---|---|---|---|---|
| Ex 2.1 | Rapeseed cake | 1.1% | 5.9% | 5.1% | 42.9% | 10.1% | 0.14 |

Example 3

Devices of the Invention for the Process According to the Invention

FIG. 1 provides embodiments of the device according to the invention. For details of the device of the invention: see the description of FIG. 1.

Typically, in the device of the invention as provided in FIG. 1B, a wire mesh cloth is applied with the cloth wrapped around a (metal, plastic) frame, preferably made of stainless steel, preferably having an opening size 4-100 μm, more preferably, 40-100 μm, with preferably having a free area of about 30%. For a prototype ALSEOS device of the invention, preferably, the closed container is a (e.g. cylindrical) chromatography column with for example an internal diameter (ID) of 0.2 m and preferably a height of about 1 m. In the device of the invention as exemplified in FIG. 1D, the filters of the filtering unit are preferably positioned substantially vertically. In a preferred embodiment of the invention, the device of the invention comprises a series of parallel positioned filtering units comprising parallel filters, each connected to at least one collector pipe. See FIGS. 1C and 1F.

In a preferred operation of the process of the invention with an exemplified device according to the invention, an Expanded Bed made of ground oil seeds is suspended in the upward flowing water. The Protein Extract (PERMEATE) is withdrawn via the Cross Flow through the wire mesh into the vertically positioned panels of filters. The Wire mesh is permeable for water and solutes and preferably blocks entrance of oil droplets (lipids, fat) into the permeate. At the Retentate Side of the closed container, segregation of particles based on size and/or density is observed due to diminishing superficial velocity of the liquid in the Tangential Flow: Fine/light particles are located near the top side of the closed container, whereas Coarse/denser particles remain near the bottom side (FIG. 1G).

FIG. 1E shows a typical part of a filtering unit of the device of the invention, with a wire mesh filter.

Example 4

Providing Protein Extract with the Process According to the Invention, Using a Device of the Invention In Table 9 and in Table 10 below, experimental details and results are provided for experiments with comminuted rapeseed meal.

For experiment 1.11 (described in Example 1) a 1.96 liter ALSEOS prototype (ALSEOS 1.0) device according to the invention was applied.

In experiment 1.11 protein extraction was performed with gently treated rapeseed cake, which was generated from the oil production process in which temperature during rapeseed pressing was maintained below 73° C.

For experiment 2.1 (described in Example 2) a 31.4 liter ALSEOS prototype (ALSEOS 2.0) device according to the invention was applied. In experiment 1.11 protein extraction was performed with harshly treated rapeseed cake, which was generated from the oil production process in which temperature during rapeseed pressing was above 100° C.

TABLE 9

Information on the starting material

| Experiment# | Process conditions | Starting material | Information starting material | Source |
|---|---|---|---|---|
| Ex. 1.11 (from Example 1) | See Table 4 | Rapeseed cake | Process temp. in oil production process max. 73° C. | Agro-Food Ent. L. Rutkowski |
| Ex 2.1 (from Example 2) | See Table 6 | Rapeseed cake | Process temp. in oil production process >100° C. | Z.T. Bielmar |

TABLE 10

Experimental conditions and results of protein extraction using the process and device according to the invention, compared to a conventional process.

| Experiment # | Process conditions | Dry weight (DW) (%) | Fat (% DW) | Fat Recovery % | Total Protein (Nx6.25) (% DW) | Total Protein Recovery % | Fat/Protein ratio Crude Extract (g DW/g DW) |
|---|---|---|---|---|---|---|---|
| Ex. 1.11 (from Example 1) | See Table 4 | 4.90% | 3.1% | 9.7% | 32.3% | 55.7% | 0.10 |
| Ex 2.1 (from Example 2) | See Table 6 | 1.14% | 5.85% | 5.05% | 42.93% | 10.1% | 0.14 |

From the protein recovery data (Table 10) it is seen that rapeseed cake pretreated with temperature above 100° C. (Experiment 2.1) provides relatively low protein recovery, compared to rapeseed cake that was only subjected to mild temperature conditions before application in the process according to the invention (Experiment 1.11).

The low recovery in experiment 2.1 can be partly explained by the fact that no salt was added to the extraction medium. It is known that solubility of proteins is positively influenced by the ionic strength of the extraction medium [Rodrigues I. M., et al., 2012]. An effect of salt concentrations in extraction medium was investigated in further experiments with the extraction performed in stirred tank, according to prior art, process conditions: pH 6.8-7.2, size distribution of comminuted rapeseed cake 0-200 μm, extraction temp. 15° C., extraction duration 120 minutes, gentle mixing intensity. Protein recovery was higher when 2% w/w NaCl was present in the extraction medium (34.7%) as compared to when no salt was added (27.4%).

An effect of heat pretreatment on rapeseed cake was investigated in further experiments with the extraction performed in stirred tank, according to prior art, process conditions: pH 6.8-7.2, size distribution of comminuted rapeseed cake 800-1000 μm, extraction temperature 15° C. extraction duration 120 minutes, 2% w/w NaCl in extraction medium, gentle mixing intensity. In the first case rapeseed cake obtained from the oil production process in which temperature did not exceed 73° C. was used while in the second case rapeseed cake pretreated with temperature higher than 100° C.; was applied. In the former case protein recovery was higher (47.9%) as compared to the latter case (38.4%), showing the influence of pre-treatment temperature, in favor of low-temperature pre-treatment.

These data show that temperature used in the oil production process influence the suitability of the starting material for the protein extraction.

That confirms that rapeseed cake (a by-product obtained when seeds are mechanically pressed in oil production) is more suitable for extraction of proteins than rapeseed meal (a byproduct obtained when oil is extracted chemically, e.g. by hexane, which must be further removed from the process in a purposely-devised toasting step by heat treatment (temperature >>100° C.)).

Abbreviations Used

ALSEOS, aqueous low shear extraction of proteins from oilseeds; ca., circa; DW, dry weight; g, gram(s); H, height; ID, internal diameter; L, liter; L/S, liquid(:)solid ratio; min, minute(s); P, permeate; R, retentate; RT, room temperature, ambient temperature; UF, ultra-filtration; um, micrometer or μm; VOL, volume (as in vol %); wt %, weight percentage w/w, weight ratio

REFERENCES

Camperi A., et al., Determination of the Average Shear Rate in a Stirred and Aerated Tank Bioreactor, Bioprocess and Biosystems Engineering. August 2008; 32(2):241-8. DOI: 10.1007/s00449-008-0242-4

Carta G, Jungbauer in: Chapter 1. Downstream Processing of Biotechnological Products, p 34 in: Protein Chromatography, Process Development and Scale-Up, Wiley VCH, 2010, ISBN: 978-3-527-31819-3.

Owusu-apenten R., Introduction to Food Chemistry, p. 83. CRC Press, 2004, ISBN 0-8493-1724-X Rodrigues I. M. et al. 2012 Isolation and valorisation of vegetable proteins from oilseed plants: Methods, limitations and potential, Journal of Food Engineering, Volume 109, issue 3, Pages 337-346

Villadsen J, Liden G; Bioreactor Engineering Principles, Chapter 11, p 500, Springer 2003, ISBN 987-1-4613-5230-3

The invention claimed is:

1. A process for preparing a protein extract from meal or oil cake of oil seeds, the process comprising:
    (a) preparing in a container a mixture of an aqueous solution and comminuted meal or oil cake from oil seeds, wherein the comminuted particles have an average particle size (d32) smaller than 1000 μm;
    (b) creating a fluidized bed of the comminuted meal or oil cake particles in the container by a flow generator provided in the lower part of the container and letting at least a part of the proteins present in the comminuted meal or oil cake dissolve into the aqueous solution, wherein the flow generator comprises a distributer for the aqueous solution, which distributer is arranged for generating a flow of aqueous solution from the lower part of the container to the upper part of the container, such that an upward flow of the aqueous solution is formed which creates the fluidized bed of the particles;

(c) separating under fluidized bed conditions at least a part of the dissolved protein from the mixture by at least one filtering unit provided in the container and positioned above the distributer for the aqueous solution, such that the protein extract is obtained.

2. The process according to claim 1, wherein the comminuted particles have an average particle size (d32) between 800 µm and 1000 µm.

3. The process according to claim 1, wherein the comminuted particles have an average particle size (d32) smaller than 200 µm.

4. The process according to claim 1, wherein the aqueous solution is water, or a mixture of water and less than 20% by volume of the aqueous solution of a water soluble organic solvent selected from the group consisting of alcohols, ketones, or mixtures thereof.

5. The process according to claim 1, wherein the aqueous solution further comprises at least one additive selected from the group consisting of an inorganic salt, a preservative, or mixtures thereof.

6. The process according to claim 1, wherein the aqueous solution has a pH of 4 to 10.

7. The process according to claim 1, wherein the comminuted meal or oil cake is prepared from soy, rapeseed, sun flower, flax, linola, coconut, mustard seed meals, cottonseed, grain, wheat, rye, oat, rice, rice bran or legumes.

8. The process according to claim 1, wherein the comminuted meal or oil cake is cold-pressed.

9. The process according to claim 1, wherein the comminuted meal or oil cake is non-hexane treated.

10. The process according to claim 1, wherein the aqueous solution has an ionic strength of 0.05 to 0.6.

11. The process according to claim 1, wherein steps (b) and (c) are performed at a temperature below 50° C.

12. The process according to claim 1, wherein in step (c) protein is selectively separated under the fluidized bed conditions by a selected shear rate and a selected superficial average velocity of the flow of aqueous solution from the flow generator, such that an enriched protein extract is obtained.

13. The process according to claim 1, wherein in step (c) the separation by the at least one filtering unit is under low shear rate of below 20 per second.

14. The process according to claim 1, wherein the comminuted meal or oil cake particles comprise more than 5% by weight lipids.

15. The process according to claim 1, wherein the comminuted meal or oil cake particles comprise between 5 to 60% by weight protein.

16. The process according to claim 1, wherein the flow of aqueous solution from the flow generator has a superficial average velocity of 0.1 to 10 mm per second.

17. The process according to claim 1, wherein the at least one filtering unit comprises a filter having an opening size in the range of 4 to 200 µm and between 20% to 50% free area.

18. The process according to claim 1, wherein the at least one filtering unit comprises a filter made of hydrophilic material.

19. The process according to claim 18, wherein the filter is made of stainless steel.

20. The process according to claim 1, wherein the at least one filtering unit is positioned tangentially to the flow of aqueous solution created by the flow generator.

21. The process according to claim 1, wherein the process further comprises (d) subjecting the protein extract to a centrifugation step and/or a second filtration step using at least one filtering unit comprising a filter having an opening size of smaller than 10 µm, such that at least part of the lipid fraction in the protein extract is discarded from the protein extract.

22. The process according to claim 21, wherein prior to step (d) the protein extract obtained in step (c) is diafiltrated.

23. The process according to claim 21, further comprising (e), wherein methanol, ethanol or acetone is added to the protein extract, such that a protein precipitate is formed; and a further step wherein the protein precipitate is separated from the liquid fraction.

24. The process according to claim 23, wherein in step (d) or (e), ethanol is added to the protein extract.

25. The process according to claim 23, further comprising (f) drying the protein precipitate after the protein precipitate is separated from the liquid fraction.

26. The process according to claim 1, wherein in step (c) at least part of the dissolved protein is separated in 10 minutes to 200 minutes.

27. The process according to claim 1, wherein in step (c) the protein extract comprises less than 10 wt % lipids based on dry weight and the protein content of the protein extract is at least 30 wt % based on dry weight.

* * * * *